(12) United States Patent
Choi et al.

(10) Patent No.: US 11,880,654 B2
(45) Date of Patent: Jan. 23, 2024

(54) ACQUIRING EVENT INFORMATION FROM A PLURALITY OF TEXTS

(71) Applicant: SAMSUNG ELECTRONICS CO., LTD., Suwon-si (KR)

(72) Inventors: Hyungtak Choi, Suwon-si (KR); Hyeonmok Ko, Suwon-si (KR); Munjo Kim, Suwon-si (KR); Seonghan Ryu, Suwon-si (KR); Sejin Kwak, Suwon-si (KR); Lohith Ravuru, Suwon-si (KR); Ikhee Shin, Suwon-si (KR); Haehun Yang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/140,202

(22) Filed: Apr. 27, 2023

(65) Prior Publication Data
US 2023/0259545 A1   Aug. 17, 2023

Related U.S. Application Data

(63) Continuation of application No. PCT/KR2022/014458, filed on Sep. 27, 2022.

(30) Foreign Application Priority Data

Oct. 8, 2021 (KR) .......................... 10-2021-0134051

(51) Int. Cl.
*G06F 40/279* (2020.01)
*G06F 16/332* (2019.01)
(Continued)

(52) U.S. Cl.
CPC .......... *G06F 40/279* (2020.01); *G06F 3/0485* (2013.01); *G06F 16/3329* (2019.01);
(Continued)

(58) Field of Classification Search
CPC .. G06F 16/345; G06F 3/0485; G06F 16/3329; G06F 40/205; G06F 40/279; G06V 30/153; G06N 3/08
See application file for complete search history.

(56) References Cited

U.S. PATENT DOCUMENTS

| | | | |
|---|---|---|---|
| 3,502,585 A | 3/1970 | Quimby | |
| 8,157,205 B2 | 4/2012 | McWhirk | |

(Continued)

FOREIGN PATENT DOCUMENTS

| | | |
|---|---|---|
| CN | 111985467 A | 11/2020 |
| KR | 10-1451612 B1 | 10/2014 |

(Continued)

OTHER PUBLICATIONS

International Search Report (PCT/ISA/210) issued by the International Searching Authority dated Jan. 20, 2023 for International Patent Application No. PCT/KR2022/014458.

(Continued)

*Primary Examiner* — Asher D Kells
(74) *Attorney, Agent, or Firm* — Sughrue Mion, PLLC

(57) ABSTRACT

An electronic device and a method for controlling thereof are provided. The electronic device includes a display, a memory storing at least one instruction, and a processor, wherein the processor is configured to, by executing the at least one instruction, extract a plurality of texts displayed on a chat window of a message application and collect the texts, input the plurality of collected texts into a trained first neural network model and align the plurality of texts in order, input the plurality of texts aligned in order into a trained second neural network model and identify whether additional information for acquiring event information from the plurality of texts is necessary, and acquire event information from the plurality of texts based on the identification result.

20 Claims, 15 Drawing Sheets

(51) Int. Cl.
*G06F 3/0485* (2022.01)
*G06F 40/205* (2020.01)
*G06N 3/08* (2023.01)
*G06F 16/34* (2019.01)
*G06V 30/148* (2022.01)

(52) U.S. Cl.
CPC ............ *G06F 40/205* (2020.01); *G06N 3/08* (2013.01); *G06F 16/345* (2019.01); *G06V 30/153* (2022.01)

(56) References Cited

U.S. PATENT DOCUMENTS

| | | | |
|---|---|---|---|
| 9,727,204 B2 | 8/2017 | Yoon et al. | |
| 9,870,345 B2 | 1/2018 | Sharifi et al. | |
| 10,650,816 B2 | 5/2020 | Lee et al. | |
| 10,984,337 B2 | 4/2021 | Bai et al. | |
| 10,986,046 B2 | 4/2021 | Kim | |
| 11,210,469 B2* | 12/2021 | Chen | G06F 16/355 |
| 2012/0157134 A1 | 6/2012 | Lee et al. | |
| 2015/0007059 A1* | 1/2015 | Zilmer | G06F 3/0485 |
| | | | 715/753 |
| 2015/0033144 A1 | 1/2015 | Kim | |
| 2015/0033178 A1* | 1/2015 | Zilmer | G06F 40/274 |
| | | | 715/780 |
| 2015/0278199 A1* | 10/2015 | Hazen | G06F 40/205 |
| | | | 704/9 |
| 2015/0347534 A1* | 12/2015 | Gross | H04L 51/42 |
| | | | 707/722 |
| 2015/0347985 A1* | 12/2015 | Gross | G06F 3/0482 |
| | | | 705/7.19 |
| 2016/0360336 A1* | 12/2016 | Gross | H04W 4/025 |
| 2016/0360382 A1* | 12/2016 | Gross | G06F 9/453 |
| 2017/0147919 A1 | 5/2017 | Lee et al. | |
| 2017/0200128 A1* | 7/2017 | Kumahara | H04L 67/53 |
| 2017/0329745 A1* | 11/2017 | Sharifi | G06Q 10/107 |
| 2018/0350180 A1 | 12/2018 | Onischuk | |
| 2020/0320159 A1 | 10/2020 | Matthews | |
| 2021/0327446 A1 | 10/2021 | Hwang et al. | |
| 2022/0351151 A1* | 11/2022 | Choi | G06V 10/82 |
| 2023/0063713 A1* | 3/2023 | Lukyanenko | G06F 16/345 |

FOREIGN PATENT DOCUMENTS

| | | |
|---|---|---|
| KR | 10-2014-0128381 A | 11/2014 |
| KR | 10-2015-0011879 A | 2/2015 |
| KR | 10-2017-0060567 A | 6/2017 |
| KR | 10-2018-0092915 A | 8/2018 |
| KR | 10-2020-0002141 A | 1/2020 |
| KR | 10-2208387 B1 | 1/2021 |

OTHER PUBLICATIONS

Written Opinion (PCT/ISA/237) issued by the International Searching Authority dated Jan. 20, 2023 for International Patent Application No. PCT/KR2022/014458.

* cited by examiner

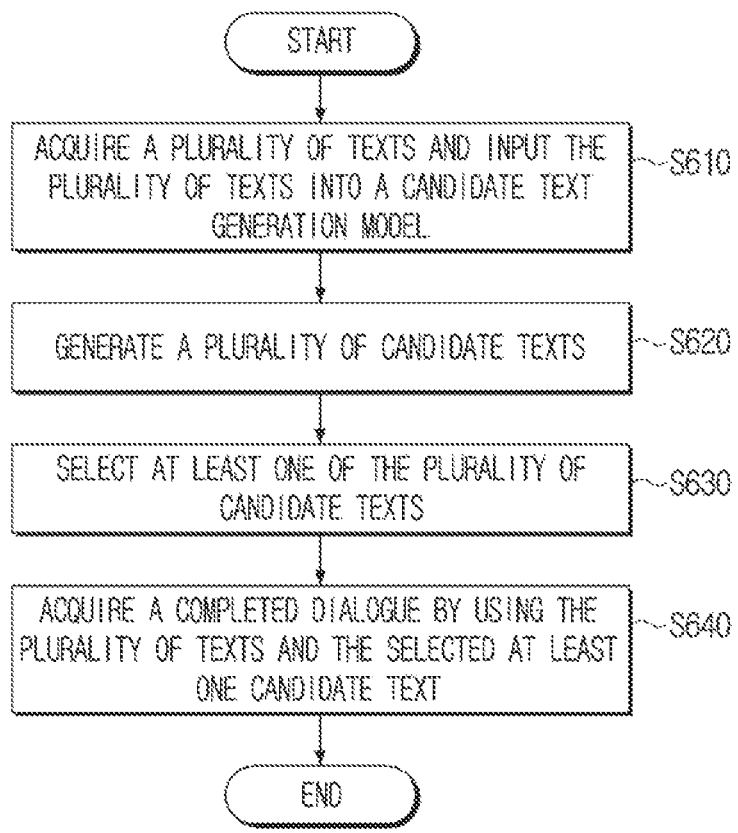

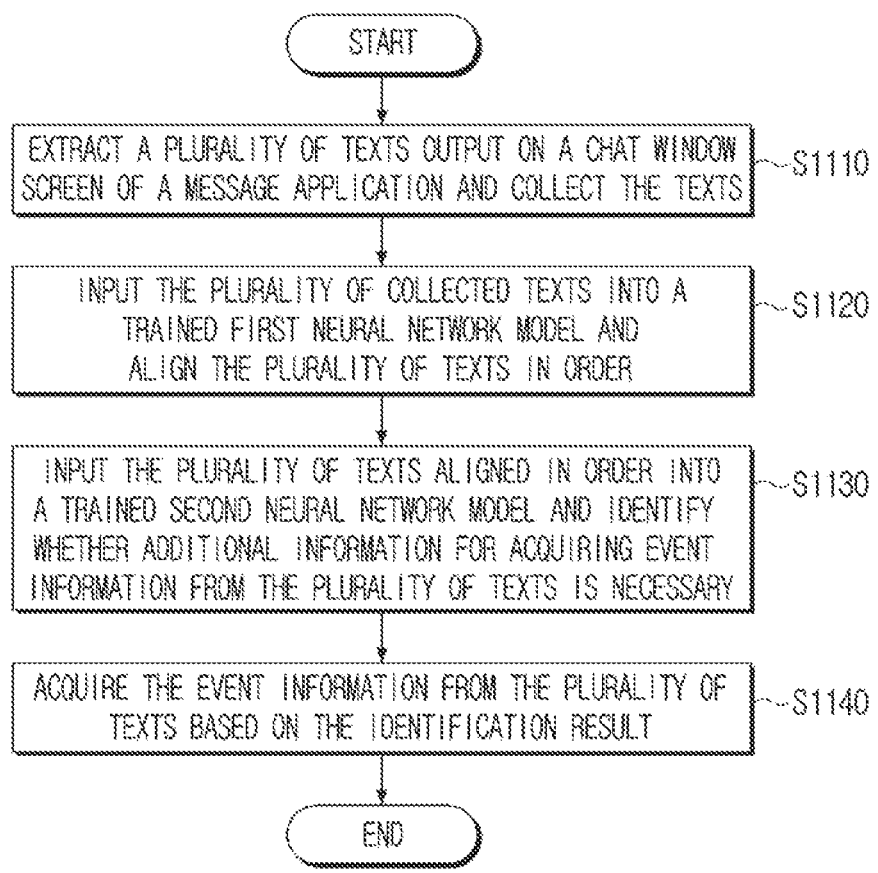

ACQUIRING EVENT INFORMATION FROM A PLURALITY OF TEXTS

CROSS-REFERENCE TO RELATED APPLICATION(S)

This application is a bypass continuation of PCT International Application No. PCT/KR2022/014458, which was filed on Sep. 27, 2022, and claims priority to Korean Patent Application No. 10-2021-0134051, filed on Oct. 8, 2021, in the Korean Intellectual Property Office, the disclosures of which are incorporated herein by reference in their entireties.

BACKGROUND

1. Field

The disclosure relates to an electronic device, and more particularly, to an electronic device that extracts event information based on texts included in a message application and provides a service corresponding to the event information to a user, and a method for controlling the electronic device.

2. Description of Related Art

An electronic device such as a smartphone may extract event information from texts (including images and emoticons) input through a message application (or, a messenger application, a chatting application), and provide a service corresponding to the extracted event information (e.g., a schedule management service, a reservation service, a shopping service, etc.).

However, in the case of a message application (e.g., KakaoTalk™, Line™, Whats App™, etc.) provided by a third party, information stored in the application cannot be accessed at a platform (e.g., an operating system (OS)) end, and thus information on texts displayed on a chat window screen of the message application needs to be extracted and managed.

Here, in the case of moving the chat window screen or moving to a new chat window screen by a user interaction, a problem occurs that the order of texts extracted from the platform is messed up. For example, as illustrated in FIG. 1, while a display is displaying a first screen 10, texts may be extracted according to the order included in the first screen 10. That is, while the first screen 10 is being displayed, the platform may extract the texts in the order of a text 1 to a text 5, as illustrated in the left lower end 20 in FIG. 1. However, if an interaction of scrolling the chat window screen to the lower direction is input by the user, the display may display a second screen 11 wherein a text −2 to a text 0 which are the previous texts of the text 1 to the text 5 displayed on the first screen 10 are newly included. While the display is displaying the second screen 11, the platform may newly extract the text 0 to the text −2. That is, while the second screen 11 is displayed, the platform may extract the texts in the order of the text 4, the text 5, the text 0, the text −1, and the text −2, as illustrated in the middle part 21 of the lower end in FIG. 1. Also, if an interaction of scrolling the chat window screen to the upper direction is input by the user, the display may display a third screen 12 wherein a text 3 and a text 4 which are the subsequent texts of the text −2 to the text 2 displayed on the second screen 11 are newly included. While the display is displaying the third screen 12, the platform may newly extract the text 3 and the text 4. That is, while the third screen 12 is displayed, the platform may extract the texts in the order of the text 0, the text −1, the text −2, the text 3, and the text 4, as illustrated in the right lower end 22 in FIG. 1. As illustrated in FIG. 1, in case the order of extracted texts is changed according to a user interaction, a problem that meaningful event information cannot be extracted, or incorrect event information is extracted may occur.

In addition, in case texts on the currently displayed chat window screen, which were extracted by the platform, are a part of a dialogue, it is difficult to extract meaningful event information, and thus there is a limitation that a smooth service cannot be provided.

SUMMARY

The disclosure was devised for resolving the aforementioned problems, and the purpose of the disclosure is in providing an electronic device that aligns the order of a plurality of texts extracted from a chat window screen of a message application, identifies whether additional information for generating event information from the plurality of aligned texts is necessary, and acquires event information based on the identification result, and a method for controlling thereof.

An electronic device according to an embodiment of the disclosure includes a display, a memory storing at least one instruction, and a processor, wherein the processor is configured to, by executing the at least one instruction, extract a plurality of texts displayed on a chat window of a message application and collect the texts, input the plurality of collected texts into a trained first neural network model and align the plurality of texts in order, input the plurality of texts aligned in order into a trained second neural network model and identify whether additional information for acquiring event information from the plurality of texts is necessary, and acquire event information from the plurality of texts based on the identification result.

Also, the processor may, based on identifying that additional information for acquiring event information from the plurality of texts is not necessary, acquire the event information by using only the plurality of acquired texts.

In addition, the processor may, based on identifying that additional information for acquiring event information from the plurality of texts is necessary, input the plurality of texts into a trained third neural network model and acquire a plurality of candidate texts for acquiring the additional information, select at least one of the plurality of candidate texts, and acquire the event information by using the plurality of texts and the selected at least one candidate text.

Further, the processor may, based on identifying that additional information for acquiring event information from the plurality of texts is necessary, identify a direction wherein additional information exists before or after the plurality of texts, and control the display to provide a UI for scrolling to the identified direction.

Also, the processor may, based on detecting a scroll interaction based on the UI, scroll a chat window screen according to the scroll interaction, and acquire the event information by using the plurality of texts and texts displayed on the scrolled screen.

In addition, the processor may, based on identifying that additional information for acquiring event information from the plurality of texts is necessary, generate a query text for acquiring the additional information, acquire a response text for the query text, and acquire the event information by using the plurality of texts and the response text.

Further, the first neural network model may include at least one of a sentence sequence prediction model that inputs two texts among the plurality of texts and determines the sequence relation between the two texts or a sentence order prediction model that inputs the plurality of texts and determines the order among the plurality of texts.

Also, the processor may capture the chat window of the message application, and perform optical character recognition (OCR) for the captured chat window image and extract a plurality of texts displayed on the chat window.

In addition, the processor may acquire a summary sentence corresponding to the event information from the plurality of texts, and control the display to provide a notification message including the acquired summary sentence.

Further, a method for controlling an electronic device according to an embodiment of the disclosure includes the steps of extracting a plurality of texts displayed on a chat window of a message application and collecting the texts, inputting the plurality of collected texts into a trained first neural network model and aligning the plurality of texts in order, inputting the plurality of texts aligned in order into a trained second neural network model and identifying whether additional information for acquiring event information from the plurality of texts is necessary, and acquiring event information from the plurality of texts based on the identification result.

Also, the step of acquiring may include the step of, based on identifying that additional information for acquiring event information from the plurality of texts is not necessary, acquiring the event information by using only the plurality of acquired texts.

In addition, the step of acquiring may include the steps of, based on identifying that additional information for acquiring event information from the plurality of texts is necessary, inputting the plurality of texts into a trained third neural network model and acquiring a plurality of candidate texts for acquiring the additional information, selecting at least one of the plurality of candidate texts, and acquiring the event information by using the plurality of texts and the selected at least one candidate text.

Further, the step of acquiring may include the steps of, based on identifying that additional information for acquiring event information from the plurality of texts is necessary, identifying a direction wherein additional information exists before or after the plurality of texts, and providing a UI for scrolling to the identified direction.

Also, the step of acquiring may include the steps of, based on detecting a scroll interaction based on the UI, scrolling a chat window screen according to the scroll interaction, and acquiring the event information by using the plurality of texts and texts displayed on the scrolled screen.

In addition, the step of acquiring may include the steps of, based on identifying that additional information for acquiring event information from the plurality of texts is necessary, generating a query text for acquiring the additional information, acquiring a response text for the query text, and acquiring the event information by using the plurality of texts and the response text.

Further, the first neural network model may include at least one of a sentence sequence prediction model that inputs two texts among the plurality of texts and determines the sequence relation between the two texts or a sentence order prediction model that inputs the plurality of texts and determines the order among the plurality of texts.

Also, the step of collecting may include the steps of capturing the chat window of the message application, and performing optical character recognition (OCR) for the captured chat window image and extracting a plurality of texts displayed on the chat window.

In addition, the control method may include the steps of acquiring a summary sentence corresponding to the event information from the plurality of texts, and providing a notification message including the acquired summary sentence.

According to an embodiment of the disclosure as described above, an electronic device can provide meaningful event information by using a plurality of texts included in a chat window screen of a message application.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 6 is a flow chart for illustrating a method for acquiring a completed dialogue based on a plurality of candidate texts according to an embodiment of the disclosure;

FIG. 11 is a flow chart for illustrating a method for controlling an electronic device according to an embodiment of the disclosure.

DETAILED DESCRIPTION

Figure 1:
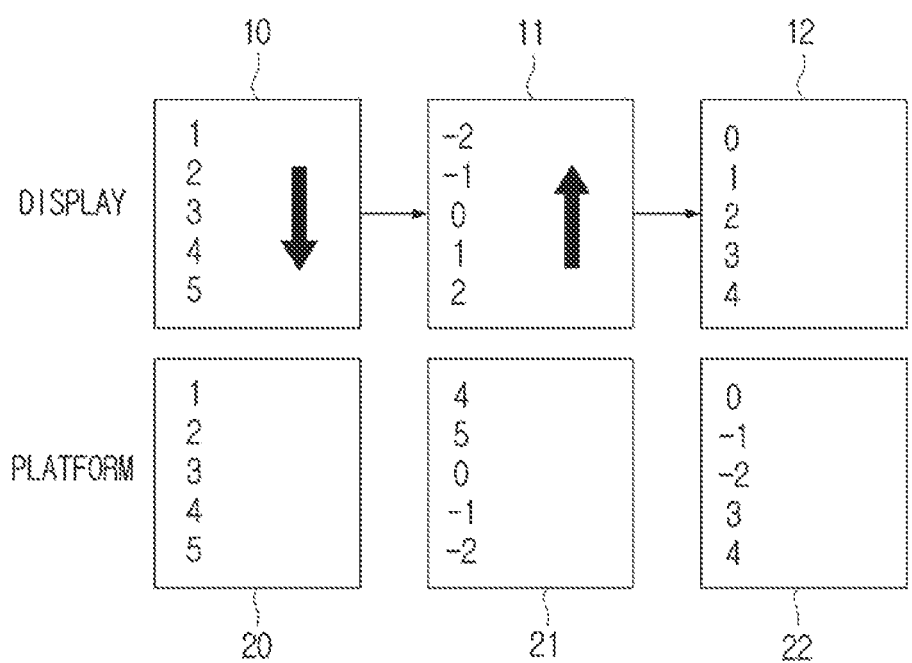
FIG. 1 is a diagram for illustrating an order by which a platform extracts texts in the prior art.

Various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but they should be interpreted to include various modifications, equivalents, and/or alternatives of the embodiments of the disclosure. Also, with respect to the detailed description of the drawings, similar components may be designated by similar reference numerals.

Further, in describing the disclosure, in case it is determined that detailed explanation of related known functions or features may unnecessarily confuse the gist of the disclosure, the detailed explanation will be omitted.

In addition, the embodiments described below may be modified in various different forms, and the scope of the technical idea of the disclosure is not limited to the embodiments below. Rather, these embodiments are provided to make the disclosure more sufficient and complete, and to fully convey the technical idea of the disclosure to those skilled in the art.

Also, the terms used in the disclosure are used only to explain specific embodiments, and are not intended to limit the scope of the disclosure. Further, singular expressions include plural expressions, unless defined obviously differently in the context.

In addition, in the disclosure, expressions such as "have," "may have," "include," and "may include" denote the existence of such characteristics (e.g.: elements such as numbers, functions, operations, and components), and do not exclude the existence of additional characteristics.

Further, in the disclosure, the expressions "A or B," "at least one of A and/or B," or "one or more of A and/or B" and the like may include all possible combinations of the listed items. For example, "A or B," "at least one of A and B," or "at least one of A or B" may refer to all of the following cases: (1) including at least one A, (2) including at least one B, or (3) including at least one A and at least one B.

Also, the expressions "first," "second," and the like used in the disclosure may describe various elements regardless of any order and/or degree of importance. Also, such expressions are used only to distinguish one element from another element, and are not intended to limit the elements.

Meanwhile, the description in the disclosure that one element (e.g.: a first element) is "(operatively or communicatively) coupled with/to" or "connected to" another element (e.g.: a second element) should be interpreted to include both the case where the one element is directly coupled to the another element, and the case where the one element is coupled to the another element through still another element (e.g.: a third element).

In contrast, the description that one element (e.g.: a first element) is "directly coupled" or "directly connected" to another element (e.g.: a second element) can be interpreted to mean that still another element (e.g.: a third element) does not exist between the one element and the another element.

Also, the expression "configured to" used in the disclosure may be interchangeably used with other expressions such as "suitable for," "having the capacity to," "designed to," "adapted to," "made to," and "capable of," depending on cases. Meanwhile, the term "configured to" does not necessarily mean that a device is "specifically designed to" in terms of hardware.

Instead, under some circumstances, the expression "a device configured to" may mean that the device "is capable of" performing an operation together with another device or component. For example, the phrase "a processor configured (or set) to perform A, B, and C" may mean a dedicated processor (e.g.: an embedded processor) for performing the corresponding operations, or a generic-purpose processor (e.g.: a CPU or an application processor) that can perform the corresponding operations by executing one or more software programs stored in a memory device.

Further, in the embodiments of the disclosure, 'a module' or 'a part' may perform at least one function or operation, and may be implemented as hardware or software, or as a combination of hardware and software. Also, a plurality of 'modules' or 'parts' may be integrated into at least one module and implemented as at least one processor, excluding 'a module' or 'a part' that needs to be implemented as specific hardware.

Meanwhile, various elements and areas in the drawings were illustrated schematically. Accordingly, the technical idea of the disclosure is not limited by the relative sizes or intervals illustrated in the accompanying drawings.

Hereinafter, the embodiments of the disclosure will be described in detail with reference to the accompanying drawings, such that those having ordinary skill in the art to which the disclosure belongs can easily carry out the disclosure.

Figure 2:
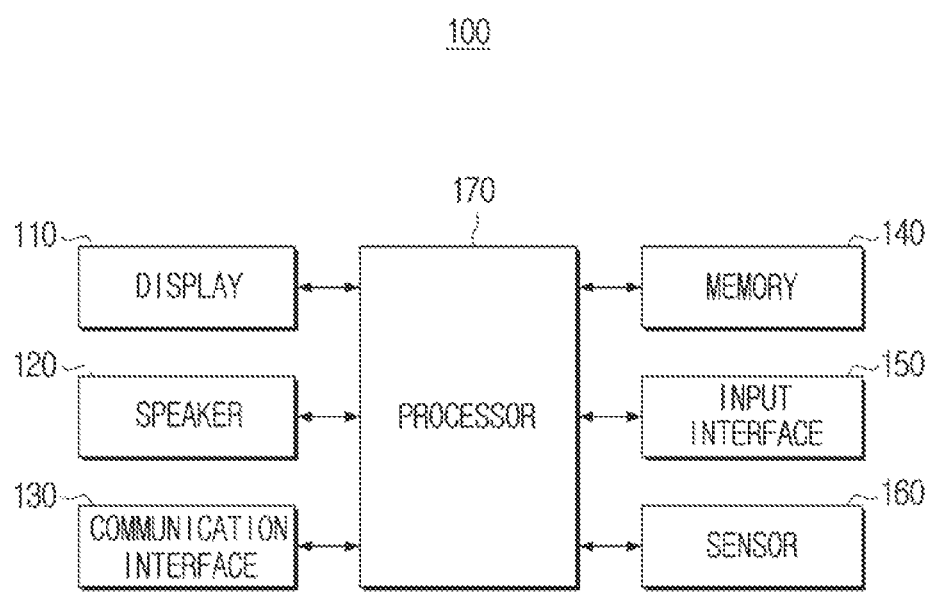
FIG. 2 is a block diagram illustrating a configuration of an electronic device according to an embodiment of the disclosure.

FIG. 2 is a block diagram illustrating a configuration of an electronic device according to an embodiment of the disclosure. As illustrated in FIG. 2, the electronic device 100 may include a display 110, a speaker 120, a communication interface 130, a memory 140, an input interface 150, a sensor 160, and a processor 170. Here, the electronic device 100 may be implemented as a smartphone. Meanwhile, the electronic device 100 according to the disclosure is not limited to a device of a specific type, but it may be implemented as electronic devices 100 in various types such as a tablet PC and a digital camera, etc.

The display 110 may display images provided from various sources. In particular, the display 110 may display a chat window screen of a message application. Also, the display 110 may display a UI for guiding scrolling on a chat window screen, a UI including event information, etc.

Meanwhile, the display 110 may be implemented as a liquid crystal display (LCD) panel, organic light emitting diodes (OLED), etc. Also, the display 110 may be implemented as a flexible display, a transparent display, etc. depending on cases. However, the display 110 according to the disclosure is not limited to a specific type.

The speaker 120 may output a voice message. In particular, in case a message was received from an external terminal, the speaker 120 may provide the message in a form of a voice message, for guiding receipt of a message. Here, the speaker 120 may be included inside the electronic device 100, but this is merely an example, and the speaker 120 may be electronically connected with the electronic device 100, and may be located outside.

The communication interface 130 may include a circuit, and perform communication with an external device. Specifically, the processor 170 may receive various kinds of data or information from an external device connected through the communication interface 130, and may also transmit various kinds of data or information to an external device.

The communication interface 130 may include at least one of a Wi-Fi module, a Bluetooth module, a wireless communication module, or an NFC module. Specifically, a Wi-Fi module and a Bluetooth module may perform communication by using a Wi-Fi method and a Bluetooth method, respectively. In the case of using a Wi-Fi module or a Bluetooth module, various types of connection information such as an SSID is transmitted and received first, and connection of communication is performed by using the information, and various types of information can be transmitted and received thereafter.

Also, a wireless communication module may perform communication according to various communication standards such as IEEE, Zigbee, $3^{rd}$ Generation (3G), $3^{rd}$ Generation Partnership Project (3GPP), Long Term Evolution (LTE), and $5^{th}$ Generation (5G). Further, an NFC module may perform communication by a near field communication (NFC) method using a 13.56 MHz band among various RF-ID frequency bands such as 135 kHz, 13.56 MHz, 433 MHz, 860-960 MHz, and 2.45 GHz.

In particular, in various embodiments according to the disclosure, the communication interface 130 may receive various types of information such as data related to various neural network models, etc. from an external device. Also, the communication interface 130 may receive a message from an external device, and transmit a message to an external device.

The memory 140 may store at least one instruction for controlling the electronic device 100. In particular, the memory 140 may store data that is necessary for a module for aligning the order of extracted texts, and acquiring event information by using the aligned texts to perform various kinds of operations. A module for aligning the order of extracted texts, and acquiring event information by using the aligned texts may include a data collection module 315, a dialogue constitution module 325, a sentence sequence prediction module 330, a sentence order prediction module 340, a dialogue completion prediction module 350, a dialogue completion module 360, an event information acquisition module 370, an information extraction module 910, a recommendation determination module 920, etc. Also, the memory 140 may store neural network models which are a plurality of language models for aligning the order of extracted texts, and acquiring event information by using the aligned texts.

Meanwhile, the memory 140 may include a non-volatile memory that can maintain stored information even if power supply is stopped, and a volatile memory that needs constant power supply for maintaining stored information. Data for aligning the order of extracted texts, and acquiring event information by using the aligned texts may be stored in a non-volatile memory. Also, a plurality of neural network models for aligning the order of extracted texts, and acquiring event information by using the aligned texts may be stored in a non-volatile memory.

Other than the above, the memory 140 may include a data collection DB 320 that stores information on texts extracted from the data collection module 315, and a dialogue DB 365 that stores a completed dialogue acquired from the dialogue constitution module 325.

The input interface 150 may include a circuit, and the processor 170 may receive input of a user instruction for controlling the operations of the electronic device 100 through the input interface 150. Specifically, the input interface 150 may be implemented in a form of being included in the display 110 as a touch screen, but this is merely an example, and the input interface 150 may be constituted as a component such as a button, a microphone, and a remote control signal receiver (not shown), etc.

In particular, in the various embodiments according to the disclosure, the input interface 150 may receive input of various user instructions such as a user instruction for inputting a message on a chat window screen, a user instruction for scrolling a chat window screen, a user instruction for inputting a response text, and a user instruction for registering event information, etc.

The sensor 160 may acquire various kinds of information related to the electronic device 100. In particular, the sensor 160 may include a GPS that can acquire location information of the electronic device 100, and may also include various sensors such as a biosensor (e.g., a heart rate sensor, a PPG sensor, etc.) for acquiring bio information of a user using the electronic device 100, a movement sensor for detecting a movement of the electronic device 100, etc. Also, the sensor 160 may include an image sensor for acquiring an image, an infrared sensor, etc.

The processor 170 may be electronically connected with the memory 140, and control the overall functions and operations of the electronic device 100.

If a user instruction for executing a message application (or a user instruction for acquiring event information, etc.) is input, the processor 170 may load the data for the module for aligning the order of extracted texts stored in the non-volatile memory, and acquiring event information by using the aligned texts to perform various kinds of operations on the volatile memory. Also, the processor 170 may load the plurality of neural network models for aligning the order of extracted texts, and acquiring event information by using the aligned texts on the volatile memory. The processor 170 may perform various kinds of operations through various kinds of modules and neural network models based on the data loaded on the volatile memory. Here, loading means an operation of calling the data stored in the non-volatile memory so that the processor 170 can access in the volatile memory, and storing the data.

In particular, the processor 170 may extract a plurality of texts output on a chat window of a message application and collect the texts, input the plurality of collected texts into a trained first neural network model and align the plurality of texts in order, input the plurality of texts aligned in order into a trained second neural network model and identify whether additional information for acquiring event information from the plurality of texts is necessary, and acquire event information from the plurality of texts based on the identification result.

Specifically, the processor 170 may be provided with a plurality of texts displayed on a chat window from a message application, or extract a plurality of texts included in a chat window of a message application through OCR recognition. Here, the texts may include sentences, words, phrases, syllables, etc.

The processor 170 may input the plurality of collected texts into the trained first neural network model and align the plurality of texts in order. Here, the first neural network model may include at least one of a sentence sequence prediction model that inputs two texts among the plurality of texts and determines the sequence relation between the two texts or a sentence order prediction model that inputs the plurality of texts and determines the order among the plurality of texts.

The processor 170 may input the plurality of texts aligned in order into the trained second neural network model (e.g., a dialogue completion prediction model), and identify whether additional information for acquiring event information from the plurality of texts is necessary. Here, the processor 170 may identify whether additional information is necessary before or after the plurality of texts through the second neural network model.

If it is identified that additional information for acquiring event information from the plurality of texts is not necessary, the processor 170 may acquire the event information by using only the plurality of acquired texts. Here, the event information is information for performing services provided in a platform, an application, or a third part inside the electronic device 100, and it may be information related to a schedule management service, a shopping service, a reservation service, etc.

If it is identified that additional information for acquiring event information from the plurality of texts is necessary, the processor 170 may acquire additional information for acquiring the event information by completing the dialogue.

As an example, the processor 170 may input the plurality of texts into a trained third neural network model (e.g., a candidate text generation model) and acquire a plurality of candidate texts for acquiring the additional information. Then, the processor 170 may select at least one of the plurality of candidate texts. Here, the processor 170 may select a candidate text having the highest probability among the plurality of candidate texts, but this is merely an example, and the processor 170 may select one candidate text among the plurality of candidate texts by a user selection. The processor 170 may acquire the event information by using the plurality of texts and the selected at least one candidate text.

As another example, the processor 170 may identify a direction wherein additional information exists before or after the plurality of texts based on information output by the dialogue completion prediction model, and control the display 110 to provide a UI for scrolling to the identified direction. Then, if a scroll interaction based on the UI is detected, the processor 170 may control the display 110 to scroll a chat window screen according to the scroll interaction, and acquire the event information by using the plurality of texts and texts displayed on the scrolled screen.

As still another example, the processor 170 may input the plurality of texts into a fourth neural network model (e.g., a query text generation model) and generate a query text for acquiring additional information, acquire a response text for the query text, and acquire the event information by using the plurality of texts and the response text.

Then, the processor 170 may provide various services based on the acquired event information. For example, the processor 170 may register a schedule in a calendar application, perform shopping in a shopping application, and perform reservation in a reservation application based on the event information.

Also, the processor 170 may acquire a summary sentence corresponding to the event information from the plurality of texts, and control the display 110 to provide a notification message including the acquired summary sentence.

Figure 3:
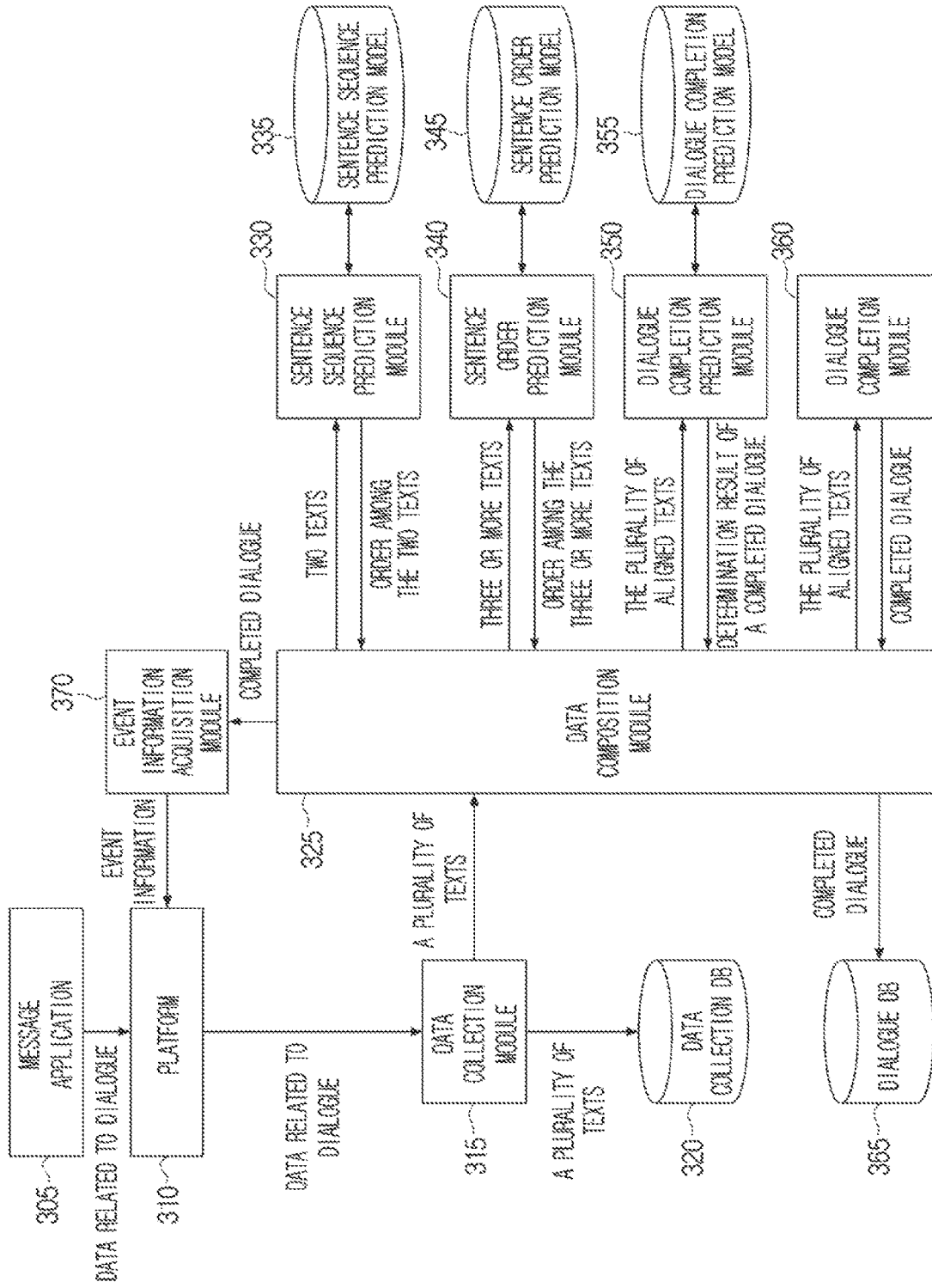
FIG. 3 is a block diagram illustrating a feature of providing event information based on a plurality of texts displayed on a message application screen according to an embodiment of the disclosure.

Hereinafter, a method for extracting texts, aligning the order of the extracted texts, and acquiring event information by using the aligned texts by using various modules included in the processor 170 will be described with reference to FIG. 3.

A message application 305 may store data related to a dialogue received from an external device or input by a user. Here, the message application 305 may provide data related to a dialogue to be displayed on the display 110 according to a user input. The data related to the dialogue may include not only texts, but also emoticons, images, etc.

A platform 310 may extract data related to a dialogue inside a chat window screen of the message application 305 displayed on the display 110. As an example, while the data related to the dialogue is displayed on the display 110, the platform 310 may acquire the data related to the dialogue displayed on the display 110 through the message application 305. As another example, the platform 310 may capture the chat window screen of the message application including the data related to the dialogue, perform optical character recognition (OCR) for the captured chat window screen, and extract a plurality of texts displayed on the chat window.

A data collection module 315 may acquire the data related to the dialogue extracted from the platform 310. Here, the data collection module 315 may store the plurality of texts in the acquired data related to the dialogue in a data collection DB 320. Then, the data collection module 315 may provide the acquired texts to a dialogue constitution module 325.

The dialogue constitution module 325 may align the plurality of texts in order, determine whether a dialogue was completed for determining whether additional information is necessary, and generate the completed dialogue.

Specifically, the dialogue constitution module 325 may align the plurality of texts in order by using a sentence sequence prediction module 330 and a sentence order prediction module 340.

Figure 4A:
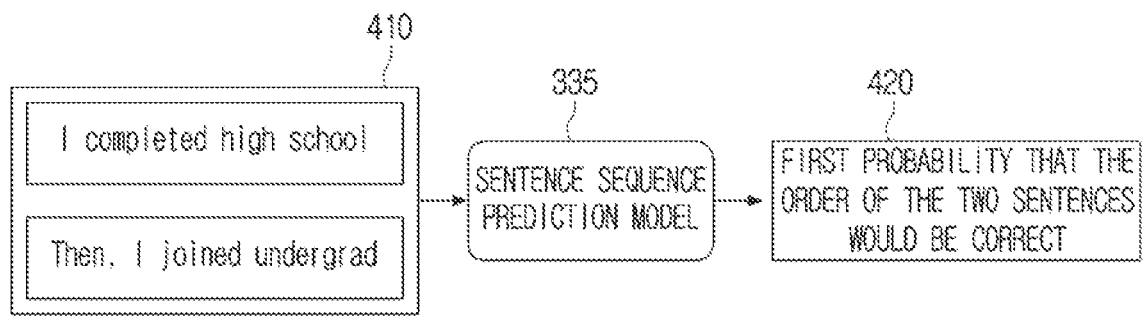
FIGS. 4A and 4B are diagrams for illustrating a sentence sequence prediction model according to an embodiment of the disclosure.
Figure 4B:
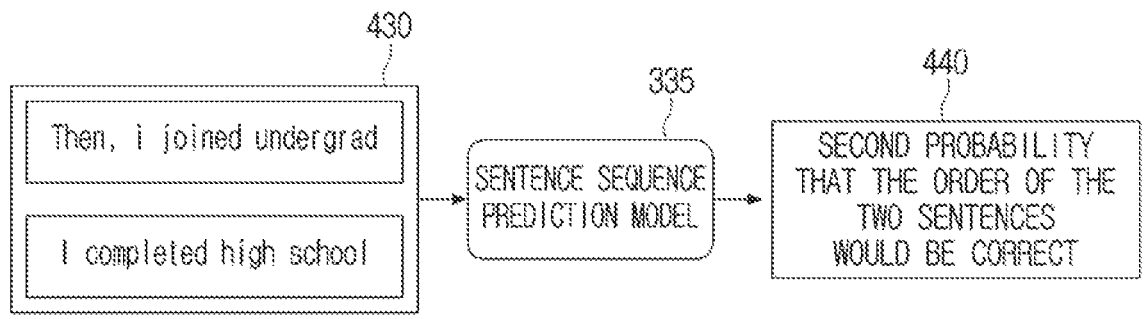

The dialogue constitution module 325 may input two texts into the sentence sequence prediction module 330. The sentence sequence prediction module 330 may input the two texts into a sentence sequence prediction model 335, and determine the sequence of the two texts. Here, the sentence sequence prediction module 330 may input the two texts while changing their order into the sentence sequence prediction model 335. For example, the sentence sequence prediction module 330 may acquire two texts ("I completed high school", "Then, I joined undergrad") from the dialogue constitution module 325. The sentence sequence prediction module 330 may input the two texts 410 in the order of "I completed high school", "Then, I joined undergrad" into the sentence sequence prediction model 335, and acquire a first probability 420 that the order of the two sentences would be correct, as illustrated in FIG. 4A. Also, the sentence sequence prediction module 330 may change the order of the two texts and input the two texts 430 in the order of "Then, I joined undergrad", "I completed high school" into the sentence sequence prediction model 335, and acquire a second probability 440 that the order of the two sentences would be correct, as illustrated in FIG. 4B. Then, the sentence sequence prediction module 330 may compare the first probability 420 and the second probability 440 and determine the order of the two sentences. For example, if the first probability 420 is higher than the second probability 440, the sentence sequence prediction module 330 may determine that the order of the two texts is "I completed high school", "Then, I joined undergrad".

Further, the dialogue constitution module 325 may input three or more texts into a sentence order prediction module 340. The sentence order prediction module 340 may input the three or more texts into a sentence order prediction model 345 and predict the order of the three or more texts. Here, the sentence order prediction model 345 may be a neural network model trained to predict a relation among a plurality of texts, determine the order of the plurality of texts, and align the plurality of texts.

Meanwhile, in an embodiment of the disclosure, it was described that the dialogue constitution module 325 uses both of the sentence sequence prediction module 330 and the sentence order prediction module 340 for improving the accuracy of determining the order of texts. However, this is merely an example, and only one of the sentence sequence prediction module 330 or the sentence order prediction module 340 may be used for improving the processing speed. In the case of using only the sentence sequence prediction module 330, the dialogue constitution module 325 may pair a plurality of texts by two each, and input the texts into the sentence sequence prediction module 330 and determine the sequence of the paired two texts, and align the plurality of texts in order based on the sequence of the plurality of paired texts.

The dialogue constitution module 325 may determine whether the plurality of texts aligned in order are a completed dialogue by using a dialogue completion prediction module 350. Here, a completed dialogue is a dialogue from which event information can be acquired, and for an uncompleted dialogue, additional information for acquiring event information may be necessary.

The dialogue constitution module 325 may input the plurality of aligned texts into the dialogue completion prediction module 350. The dialogue completion prediction module 350 may determine whether additional information exists before or after the plurality of aligned texts by using a dialogue completion prediction model 355. Here, the dialogue completion prediction module 350 may input the plurality of texts and an imaginary previous text into the dialogue completion prediction model 355 and determine whether additional information exists before the plurality of texts, and input the plurality of texts and an imaginary subsequent text into the dialogue completion prediction model 355 and determine whether additional information exists after the plurality of texts. Here, the imaginary previous text or the imaginary subsequent text may be a blank sentence.

Figure 5A:
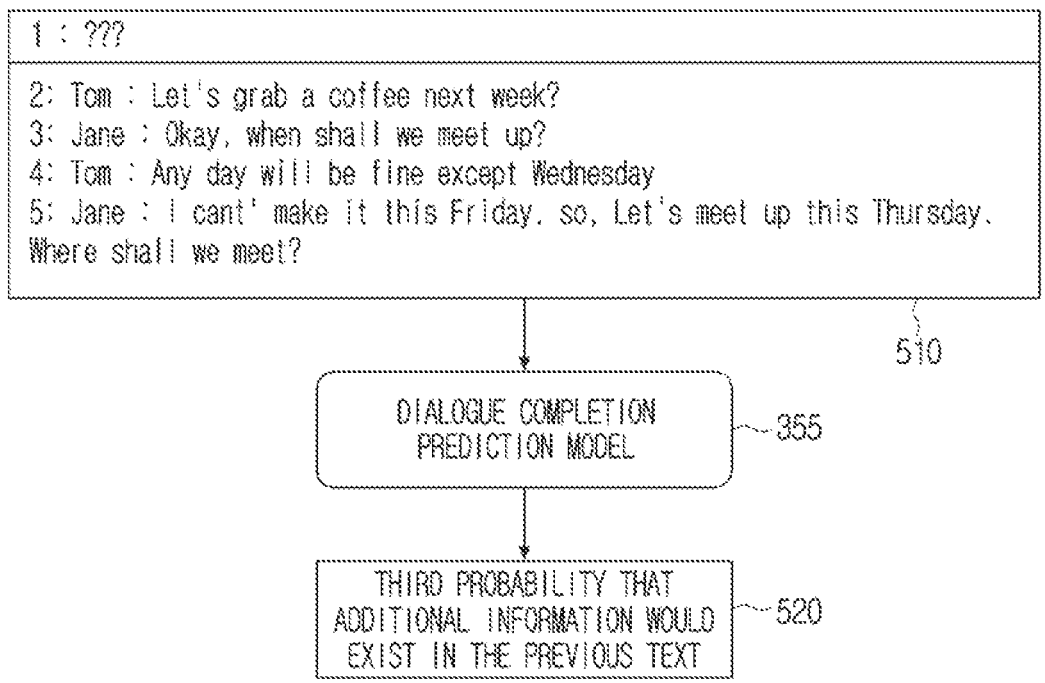
FIGS. 5A and 5B are diagrams for illustrating a sentence completion prediction model according to an embodiment of the disclosure.
Figure 5B:
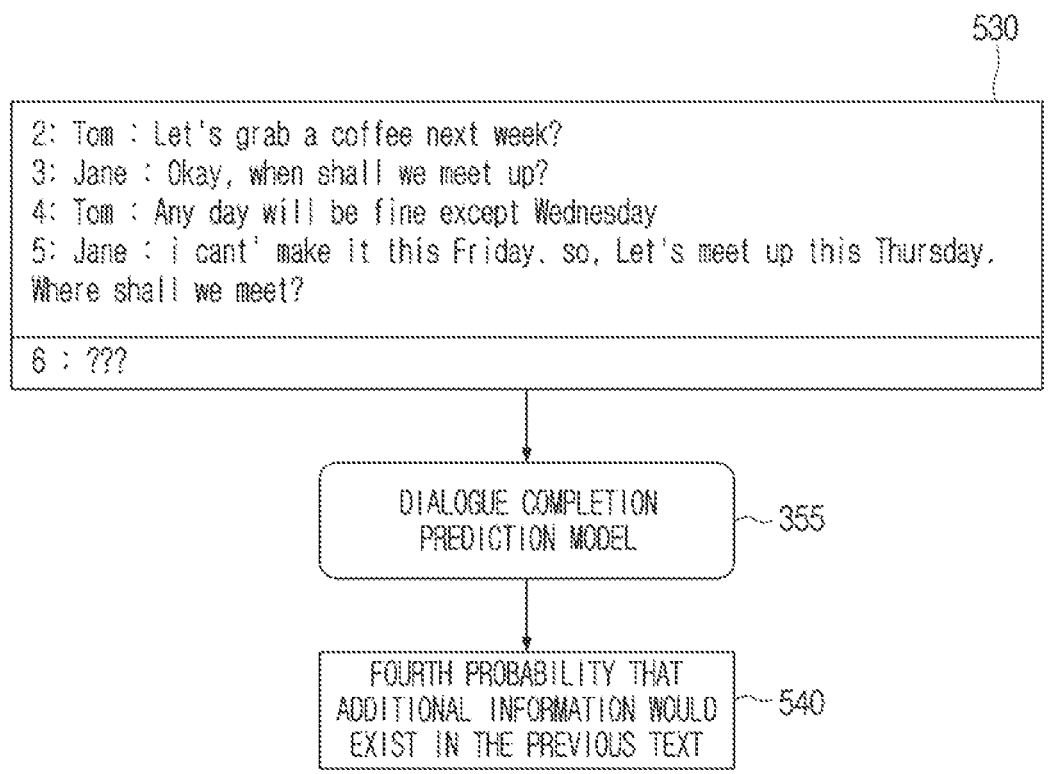

For example, as illustrated in FIG. 5A, the dialogue completion prediction module 350 may input a first dialogue 510 consisting of the plurality of texts and an imaginary previous text into the dialogue completion prediction model 355 and acquire a third probability 520 that there would be additional information before the plurality of texts. Also, as illustrated in FIG. 5B, the dialogue completion prediction module 350 may input a second dialogue 530 consisting of the plurality of texts and an imaginary subsequent text into the dialogue completion prediction model 355 and acquire a fourth probability 540 that there would be additional information after the plurality of texts.

The dialogue completion prediction module 350 may acquire information on whether the dialogue was completed based on the third probability 520 and the fourth probability 540 (i.e., whether additional information is necessary) and information on the location wherein the additional information exists. Specifically, the dialogue completion prediction module 350 may determine whether the third probability 520 and the fourth probability 540 exceed a threshold value. For example, in case the third probability 520 and the fourth probability 540 are smaller than or equal to the threshold value, the dialogue completion prediction module 350 may determine the plurality of texts as a completed dialogue. However, in case at least one of the third probability 520 or the fourth probability 540 exceeds the threshold value, the dialogue completion prediction module 350 may determine the plurality of texts as an uncompleted dialogue. Here, in case the third probability 520 exceeds the threshold value, the dialogue completion prediction module 350 may determine that additional information exists before the plurality of texts, and in case the fourth probability 540 exceeds the threshold value, the dialogue completion prediction module 350 may determine that additional information exists after the plurality of texts. In particular, in the case of the embodiments in FIG. 5A and FIG. 5B, if the third probability 520 is smaller than or equal to the threshold value and the fourth probability 540 exceeds the threshold value, the dialogue completion prediction module 350 may determine that additional information exists after the plurality of texts.

If it is determined that the plurality of texts are a completed dialogue by the dialogue completion prediction module 350, additional information for acquiring the event information is not necessary, and thus the dialogue constitution module 325 may output the completed dialogue to a dialogue DB 365 and an event information acquisition module 370.

If it is determined that the plurality of texts are an uncompleted dialogue by the dialogue completion prediction module 350, the dialogue constitution module 325 may input the plurality of aligned texts into a dialogue completion module 360 for acquiring additional information for acquiring the event information.

The dialogue completion module 360 may acquire additional information for acquiring the event information, and acquire a completed dialogue. A method for the dialogue completion module 360 to acquire additional information and acquire a completed dialogue will be described with reference to FIG. 6 to FIG. 8B.

FIG. 6 is a flow chart for illustrating a method for acquiring a completed dialogue based on a plurality of candidate texts according to an embodiment of the disclosure.

The dialogue completion module 360 may acquire a plurality of texts from the dialogue constitution module 325 and input the plurality of texts into a candidate text generation model in operation S610. Here, the candidate text generation model may be a neural network model trained to predict a text before or after a plurality of texts, and generate a plurality of candidate texts.

The dialogue completion module 360 may generate a plurality of candidate texts through the candidate text generation model in operation S620. For example, the dialogue completion module 360 may input the plurality of texts as illustrated in FIG. 5B into the candidate text generation model, and generate candidate texts such as "How about meeting at Gangnam Station?", "I will go to your office", "anywhere", etc. Here, the candidate text generation model may have been trained to generate candidate texts based on a user history.

The dialogue completion module 360 may select at least one of the plurality of candidate texts in operation S630. As an example, the dialogue completion module 360 may input the plurality of candidate texts into a selection model, and select a text having the highest probability among the plurality of candidate texts. As another example, the dialogue completion module 360 may display the plurality of candidate texts on the display 110, and select at least one candidate text according to a user input among the plurality of candidate texts. For example, the dialogue completion module 360 may select "How about meeting at Gangnam Station?" which has the highest probability or was selected by the user.

The dialogue completion module 360 may acquire a completed dialogue by using the plurality of texts and the selected at least one candidate text in operation S640. The dialogue completion module 360 may output the completed dialogue to the dialogue composition module 325.

Figure 7A:
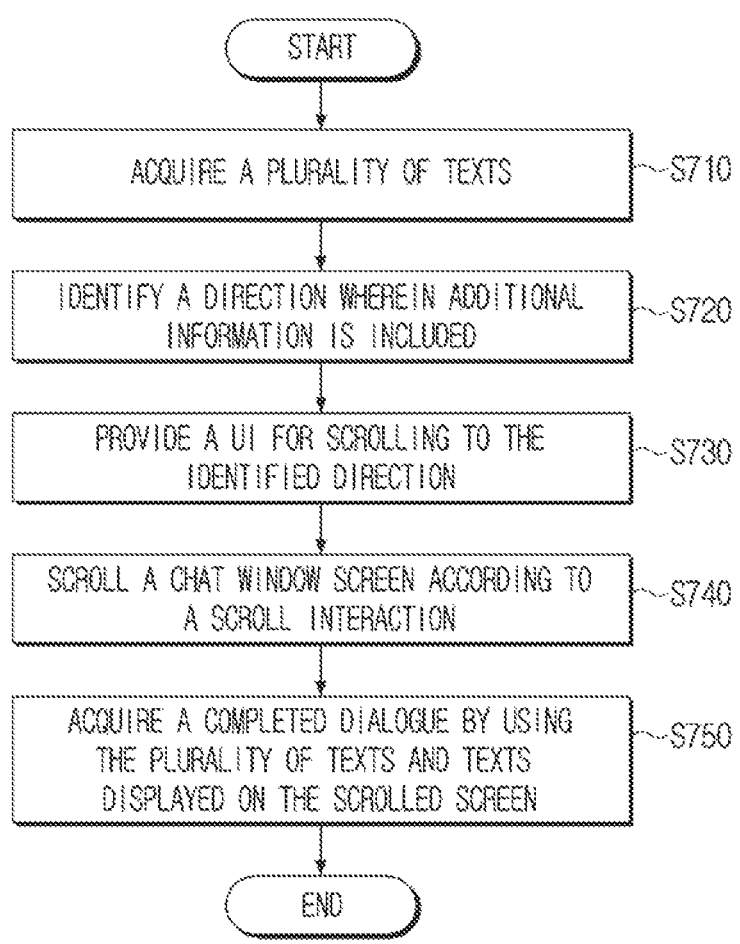
FIG. 7A is a flow chart for illustrating a method for acquiring a completed dialogue by using a scroll UI according to another embodiment of the disclosure.

FIG. 7A is a flow chart for illustrating a method for acquiring a completed dialogue by using a scroll UI according to another embodiment of the disclosure.

The dialogue completion module 360 may acquire a plurality of texts from the dialogue composition module 325 in operation S710. Here, the dialogue completion module 360 may acquire not only the plurality of texts, but also information on whether additional information exists before or after the plurality of texts.

The dialogue completion module 360 may identify a direction wherein additional information is included based on the information on whether additional information exists before or after the plurality of texts in operation S720.

Figure 7B:
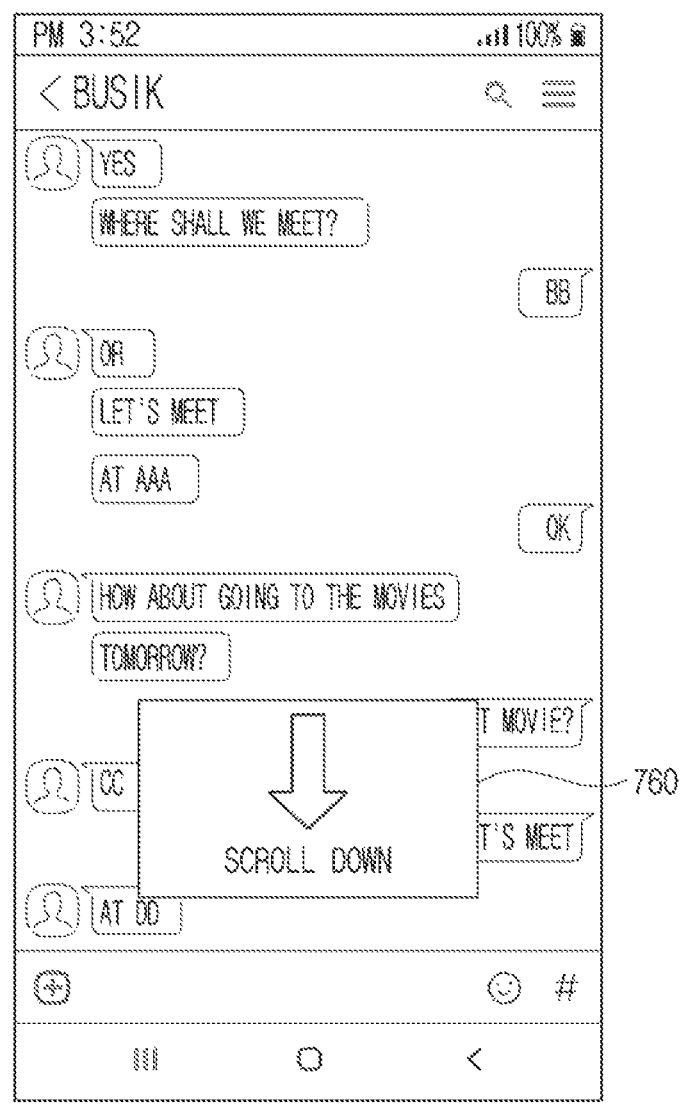
FIG. 7B is a diagram for illustrating a scroll UI according to another embodiment of the disclosure.

The dialogue completion module 360 may provide a UI for scrolling to the identified direction in operation S730. Specifically, if it is identified that additional information is included in the previous direction of the plurality of texts, the dialogue completion module 360 may provide a UI for scrolling to the upper direction on the chat window screen, and if it is identified that additional information is included in the subsequent direction of the plurality of texts, the dialogue completion module 360 may provide a UI for scrolling to the lower direction on the chat window screen. For example, if it is determined that additional information is included in the subsequent direction of the plurality of texts, the dialogue completion module 360 may control the display 110 to provide a UI 760 including an indicator indicating scrolling to the lower direction on the chat window screen and a guide message, as illustrated in FIG. 7B.

The processor 170 may scroll the chat window screen according to a scroll interaction in operation S740. Here, when the screen is scrolled, the dialogue constitution module 325 may extract an additional text inside the scrolled chat window screen, as described above, and align the plurality of texts and the additional text in order through the sentence sequence prediction module 330 and the sentence order prediction module 340, and determine whether the plurality of texts and the additional text are a completed dialogue through the dialogue completion prediction module 350.

The dialogue completion module 360 may acquire a completed dialogue by using the plurality of texts and texts displayed on the scrolled screen in operation S750. Here, the dialogue completion module 360 may output the completed dialogue to the dialogue constitution module 325.

Figure 8A:
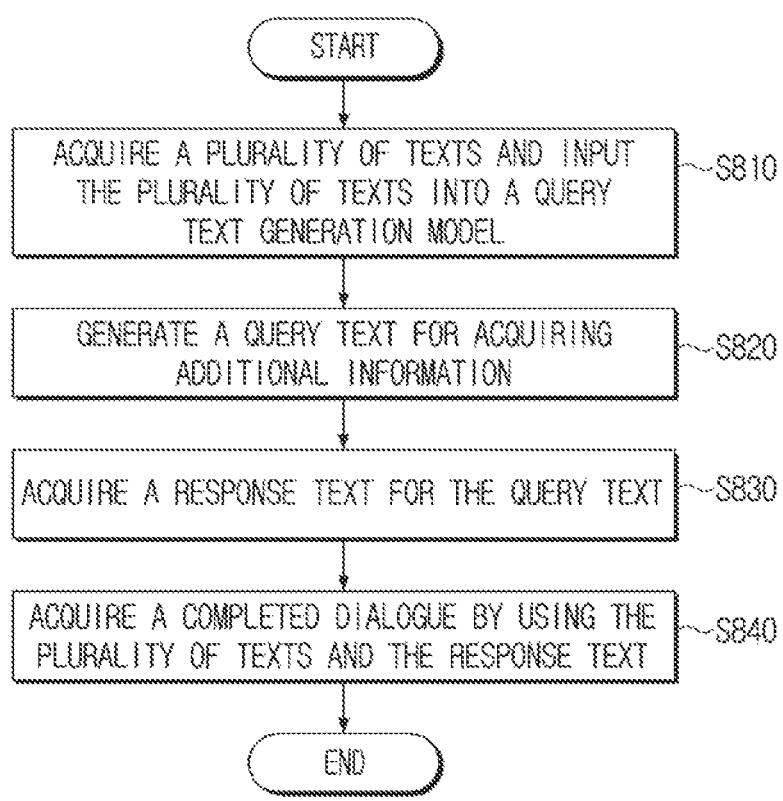
FIG. 8A is a flow chart for illustrating a method for acquiring a completed dialogue based on a response text for a query text according to another embodiment of the disclosure.

FIG. 8A is a flow chart for illustrating a method for acquiring a completed dialogue based on a response text for a query text according to another embodiment of the disclosure.

The dialogue completion module 360 may acquire a plurality of texts from the dialogue constitution module 325 and input the plurality of texts into a query text generation model in operation S810. Here, the query text generation model may be a neural network model trained to generate a query for acquiring additional information before or after the plurality of texts.

The dialogue completion module 360 may generate a query text through the query text generation model in operation S820. For example, the dialogue completion module 360 may input a plurality of texts as illustrated in FIG. 5B into the query text generation model and generate a query text such as "Where will I meet Jane on this Thursday?".

Figure 8B:
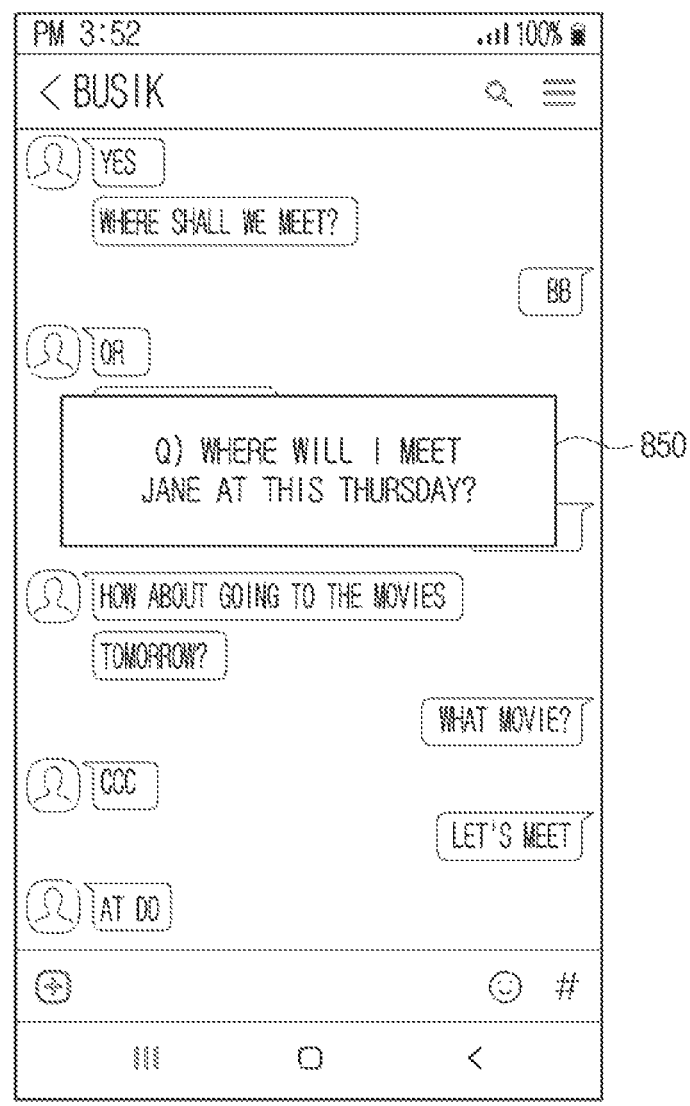
FIG. 8B is a diagram for illustrating a UI including a query text according to another embodiment of the disclosure.

The dialogue completion module 360 may acquire a response text for the query text in operation S830. Specifically, the dialogue completion module 360 may control the display 110 to provide a UI 850 including a query text as illustrated in FIG. 8B, and acquire a response text for the query text. Here, the response text may be acquired by a user's touch input, but this is merely an example, and the response text may be acquired by a voice input. Also, the query text may be provided in a form of a voice message but not the UI 850. For example, the dialogue completion module 360 may acquire a response text which is "Gangnam Station" through a touch input or a voice input.

The dialogue completion module 360 may acquire a completed dialogue by using the plurality of texts and the response text in operation S840. The dialogue completion module 360 may output the completed dialogue to the dialogue constitution module 325.

The dialogue completion module 360 may output the completed dialogue acquired by using the method as in FIG. 6 to FIG. 8B to a dialogue DB 365 and an event information acquisition module 370.

The completed dialogue stored in the dialogue DB 365 may be used in training of various neural network models or in acquiring user history information afterwards.

The event information acquisition module 370 may acquire the completed dialogue from the dialogue constitution module 325. Here, the event information acquisition module 370 may acquire event information for providing various kinds of services from the completed dialogue.

Figure 9:
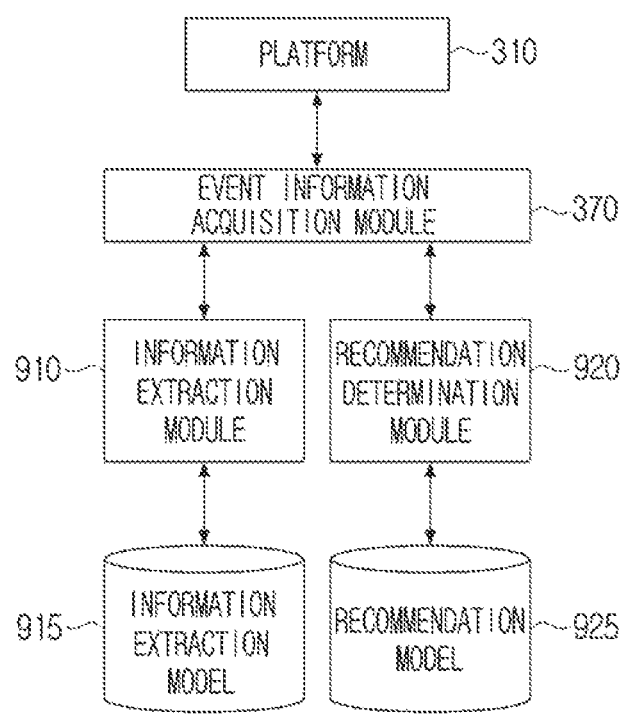
FIG. 9 is a block diagram illustrating a feature of acquiring event information according to an embodiment of the disclosure.

A method for the event information acquisition module 370 to acquire event information, and provide services will be described with reference to FIG. 9. First, the event information acquisition module 370 may output the completed dialogue to an information extraction module 910. The information extraction module 910 may input the completed dialogue into an information extraction model 915 and extract event information. For example, the information extraction module 910 may input the completed dialogue into the information extract model 915, and acquire event information for performing a schedule management service including time information, location information, schedule content information, etc. Also, the information extraction module 910 may input the completed dialogue into the information extraction model 915 and acquire a summary sentence of the completed dialogue. Here, the acquired summary sentence may be included in a notification message for performing a service and provided to a user.

A recommendation determination module 920 may determine whether to recommend a service corresponding to the acquired event information to the user. Specifically, the recommendation determination module 920 may input the acquired event information into a recommendation model 925 and acquire a probability value regarding whether to recommend the service corresponding to the event information to the user, and determine whether to recommend the service corresponding to the acquired event information to the user according to whether the probability value exceeded a threshold value.

Figure 10:
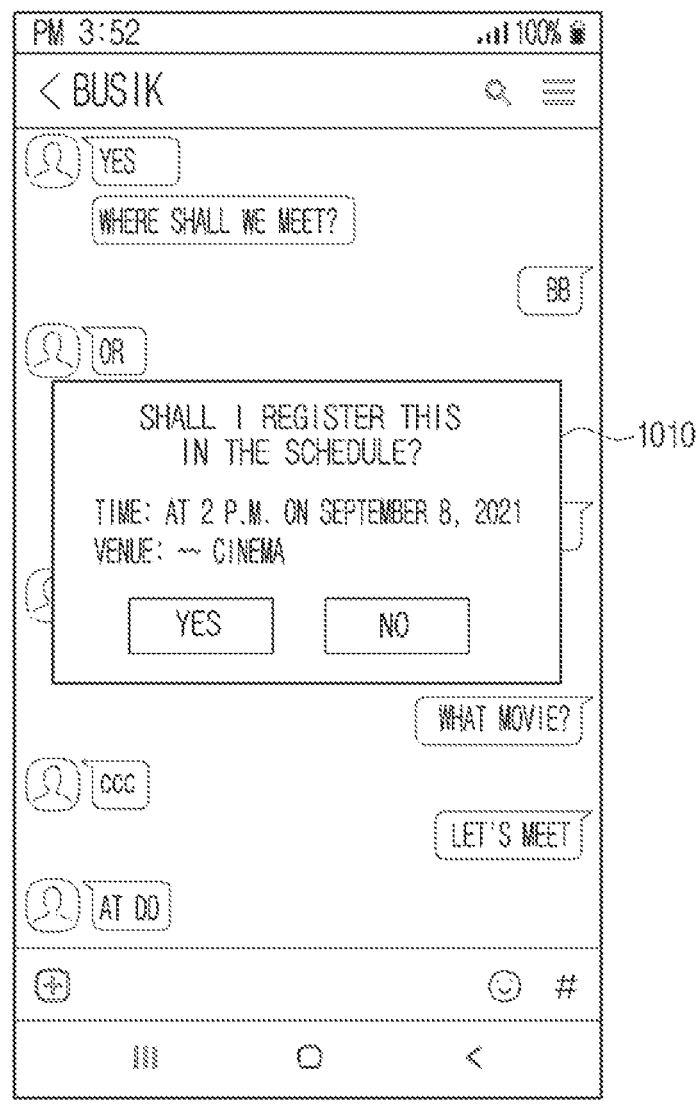
FIG. 10 is a diagram illustrating a UI including event information according to an embodiment of the disclosure.

The event information acquisition module 370 may request the service corresponding to the event information to the platform 310 or another application based on the determination result of the recommendation determination module 920. As an example, the platform 310 may control the display 110 to provide a notification message inquiring the user about whether to perform the service corresponding to the event information acquired from the completed dialogue. For example, as illustrated in FIG. 10, the platform 310 may control the display 110 to display a notification message 1010 for performing a schedule management service which is a service acquired from the event information on the chat window screen. As another example, a calendar application may register a schedule acquired from the event information in a calendar.

Meanwhile, in the aforementioned embodiment, it was described that the notification message 1010 is displayed on the chat window screen, but this is merely an example, and the message may be provided to the user by a different method (e.g., a notification UI screen providing a plurality of notification messages, a notification window in the upper part of the screen, etc.).

However, the schedule management service as described in FIG. 10 is merely an example, and various services such as a shopping service, a reservation service, etc. may be provided through the event information.

FIG. 11 is a flow chart for illustrating a method for controlling an electronic device according to an embodiment of the disclosure.

The electronic device 100 extracts a plurality of texts displayed on a chat window of a message application and collects the texts in operation S1110. Here, the electronic device 100 may extract a plurality of texts on an application end, but this is merely an example, and the electronic device 100 may capture a chat window screen, and perform OCR for the captured image, and extract a plurality of texts.

The electronic device 100 inputs the plurality of collected texts into a trained first neural network model and aligns the plurality of texts in order in operation S1120. Here, the first neural network model may include at least one of a sentence sequence prediction model that inputs two texts among the plurality of texts and determines the sequence relation between the two texts or a sentence order prediction model that inputs the plurality of texts and determines the order among the plurality of texts.

The electronic device 100 inputs the plurality of texts aligned in order into a trained second neural network model and identifies whether additional information for acquiring event information from the plurality of texts is necessary in operation S1130.

The electronic device 100 acquires event information from the plurality of texts based on the identification result in operation S1140. Specifically, if it is identified that additional information for acquiring event information from the plurality of texts is not necessary, the electronic device 100 may determine the plurality of acquired texts as a completed dialogue, and acquire the event information by using only the plurality of texts. However, if it is identified that additional information for acquiring event information from the plurality of texts is necessary, the electronic device 100 may acquire additional information by various methods and acquire a completed dialogue. As an example, the electronic device 100 may input the plurality of texts into a trained third neural network model and acquire a plurality of candidate texts for acquiring the additional information, select at least one of the plurality of candidate texts, and acquire the event information by using the plurality of texts and the selected at least one candidate text. As another example, the electronic device 100 may identify a direction wherein additional information exists before or after the plurality of texts, provide a UI for scrolling to the identified direction, scroll a chat window screen according to a scroll interaction based on the UI, and acquire the event information by using the plurality of texts and texts displayed on the scrolled screen. As still another example, the electronic device 100 may generate a query text for acquiring the additional information, acquire a response text for the query text, and acquire the event information by using the plurality of texts and the response text.

Then, the electronic device 100 may provide various services by using the event information. For example, the electronic device 100 may provide a schedule management service, a shopping service, a reservation service, etc. through the event information. Also, the electronic device 100 may acquire a summary sentence corresponding to the event information from the plurality of texts, and provide a notification message for performing a service corresponding to the event information. Here, the notification message may include the summary sentence.

Meanwhile, the functions related to neural network models as described above may be performed through a memory and a processor. The processor may consist of one or a plurality of processors. Here, the one or plurality of processors may be generic-purpose processors such as a CPU, an AP, etc., graphic-dedicated processors such as a GPU, a VPU, etc., or artificial intelligence-dedicated processors such as an NPU. The one or plurality of processors perform control to process input data according to a predefined operation rule or an artificial intelligence model stored in a non-volatile memory or a volatile memory. The predefined operation rule or the artificial intelligence model is characterized in that it is made through learning.

Here, being made through learning means that a learning algorithm is applied to a plurality of learning data, and a predefined operation rule or an artificial intelligence model having a desired characteristic is made. Such learning may be performed in a device itself wherein artificial intelligence is performed according to the disclosure, or performed through a separate server/system.

An artificial intelligence model may consist of a plurality of neural network layers. Each layer has a plurality of weight values, and performs an operation of a layer through an operation between the operation result of the previous layer and the plurality of weight values. As examples of a neural network, there are a convolutional neural network (CNN), a deep neural network (DNN), a recurrent neural network (RNN), a restricted Boltzmann Machine (RBM), a deep belief network (DBN), a bidirectional recurrent deep neural network (BRDNN), generative adversarial networks (GAN), and deep Q-networks, etc., but the neural network in the disclosure is not limited to the aforementioned examples excluding specified cases.

A learning algorithm is a method of training a specific subject device (e.g., a robot) by using a plurality of learning data and thereby making the specific subject device make a decision or make prediction by itself. As examples of learning algorithms, there are supervised learning, unsupervised learning, semi-supervised learning, or reinforcement learning, but learning algorithms in the disclosure are not limited to the aforementioned examples excluding specified cases.

Meanwhile, a storage medium that is readable by machines may be provided in the form of a non-transitory storage medium. Here, the term 'non-transitory' only means that the device is a tangible device, and does not include a signal (e.g.: an electronic wave), and the term does not distinguish a case wherein data is stored semi-permanently in a storage medium and a case wherein data is stored temporarily. For example, 'a non-transitory storage medium' may include a buffer wherein data is temporarily stored.

According to an embodiment, the method according to the various embodiments described in the disclosure may be provided while being included in a computer program product. A computer program product refers to a product, and it can be traded between a seller and a buyer. A computer program product can be distributed in the form of a storage medium that is readable by machines (e.g.: a compact disc read only memory (CD-ROM)), or may be distributed directly between two user devices (e.g.: smartphones), and distributed on-line (e.g.: download or upload) through an application store (e.g.: Play Store™). In the case of on-line distribution, at least a portion of a computer program product (e.g.: a downloadable app) may be stored in a machine-readable storage medium such as the server of the manufacturer, the server of the application store, and the memory of the relay server at least temporarily, or may be generated temporarily.

Also, each of the components (e.g.: a module or a program) according to the aforementioned various embodiments of the disclosure may consist of a single entity or a plurality of entities, and some sub-components among the aforementioned sub-components may be omitted, or different sub-components may be further included in the various embodiments. Alternatively or additionally, some components (e.g.: a module or a program) may be integrated into one entity to perform the same or similar functions performed by each component prior to integration.

In addition, operations performed by a module, a program, or another component, in accordance with the various embodiments, may be performed sequentially, in parallel, repetitively, or in a heuristic manner, or at least some operations may be performed in a different order, omitted, or a different operation may be added.

Meanwhile, the term "part" or "module" used in the disclosure may include a unit consisting of hardware, software, or firmware, and may be interchangeably used with, for example, terms such as a logic, a logical block, a component, or a circuit. In addition, "a part" or "a module" may be a component constituted as an integrated body or a minimum unit or a part thereof performing one or more functions. For example, a module may consist of an application-specific integrated circuit (ASIC).

Also, the various embodiments of the disclosure may be implemented as software including instructions stored in machine-readable storage media, which can be read by machines (e.g.: computers). The machines refer to devices that call instructions stored in a storage medium, and can operate according to the called instructions, and the devices may include an electronic device according to the aforementioned embodiments (e.g.: an electronic device 100).

In case an instruction is executed by a processor, the processor may perform a function corresponding to the instruction by itself, or by using other components under its control. An instruction may include a code that is generated or executed by a compiler or an interpreter.

Also, while preferred embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

What is claimed is:

1. An electronic device comprising:
   a display;
   a memory storing at least one instruction; and
   a processor configured to execute the at least one instruction to:
   extract a plurality of texts displayed on a chat window of a message application and collect the texts,
   input the plurality of collected texts into a trained first neural network model and align the plurality of texts in order,
   input the plurality of texts aligned in order into a trained second neural network model and identify whether additional information for acquiring event information from the plurality of texts is necessary, and
   acquire event information from the plurality of texts based on the identification result.

2. The electronic device of claim 1,
   wherein the processor is further configured to execute the at least one instruction to:
   based on identifying that additional information for acquiring event information from the plurality of texts is not necessary, acquire the event information by using only the plurality of acquired texts.

3. The electronic device of claim 1,
   wherein the processor is further configured to execute the at least one instruction to:
   based on identifying that additional information for acquiring event information from the plurality of texts is necessary, input the plurality of texts into a trained third neural network model and acquire a plurality of candidate texts for acquiring the additional information,
   select at least one of the plurality of candidate texts, and
   acquire the event information by using the plurality of texts and the selected at least one candidate text.

4. The electronic device of claim 1,
   wherein the processor is further configured to execute the at least one instruction to:
   based on identifying that additional information for acquiring event information from the plurality of texts is necessary, identify a direction wherein additional information exists before or after the plurality of texts, and
   control the display to provide a UI for scrolling to the identified direction.

5. The electronic device of claim 4,
   wherein the processor is further configured to execute the at least one instruction to:
   based on detecting a scroll interaction based on the UI, scroll a chat window screen according to the scroll interaction, and
   acquire the event information by using the plurality of texts and texts displayed on the scrolled screen.

6. The electronic device of claim 1,
   wherein the processor is further configured to execute the at least one instruction to:
   based on identifying that additional information for acquiring event information from the plurality of texts is necessary, generate a query text for acquiring the additional information,
   acquire a response text for the query text, and
   acquire the event information by using the plurality of texts and the response text.

7. The electronic device of claim 1,
   wherein the first neural network model comprises:
   at least one of a sentence sequence prediction model that inputs two texts among the plurality of texts and determines the sequence relation between the two texts or a sentence order prediction model that inputs the plurality of texts and determines the order among the plurality of texts.

8. The electronic device of claim 1,
   wherein the processor is further configured to execute the at least one instruction to:
   capture the chat window of the message application, and
   perform optical character recognition (OCR) for the captured chat window image and extract a plurality of texts displayed on the chat window.

9. The electronic device of claim 1,
   wherein the processor is further configured to execute the at least one instruction to:

acquire a summary sentence corresponding to the event information from the plurality of texts, and control the display to provide a notification message including the acquired summary sentence.

10. A method for controlling an electronic device, the method comprising:

extracting a plurality of texts displayed on a chat window of a message application and collecting the texts;

inputting the plurality of collected texts into a trained first neural network model and aligning the plurality of texts in order;

inputting the plurality of texts aligned in order into a trained second neural network model and identifying whether additional information for acquiring event information from the plurality of texts is necessary; and acquiring event information from the plurality of texts based on the identification result.

11. The control method of claim 10, wherein the acquiring the event information further comprises:

based on identifying that additional information for acquiring event information from the plurality of texts is not necessary, acquiring the event information by using only the plurality of acquired texts.

12. The control method of claim 10, wherein the acquiring the event information further comprises:

based on identifying that additional information for acquiring event information from the plurality of texts is necessary, inputting the plurality of texts into a trained third neural network model and acquiring a plurality of candidate texts for acquiring the additional information;

selecting at least one of the plurality of candidate texts; and acquiring the event information by using the plurality of texts and the selected at least one candidate text.

13. The control method of claim 10, wherein the acquiring the event information further comprises:

based on identifying that additional information for acquiring event information from the plurality of texts is necessary, identifying a direction wherein additional information exists before or after the plurality of texts; and providing a UI for scrolling to the identified direction.

14. The control method of claim 13, wherein the acquiring the event information further comprises:

based on detecting a scroll interaction based on the UI, scrolling a chat window screen according to the scroll interaction; and acquiring the event information by using the plurality of texts and texts displayed on the scrolled screen.

15. The method of claim 13, wherein the identifying the location where the additional information exists further comprises:

based on identifying the additional information exists in a first scroll direction, identifying the location where the additional information exists as being before the collected plurality of texts; and based on identifying the additional information exists in a second scroll direction, identifying the location where the additional information exists as being after the collected plurality of texts.

16. The control method of claim 10, wherein the acquiring the event information further comprises:

based on identifying that additional information for acquiring event information from the plurality of texts is necessary, generating a query text for acquiring the additional information;

acquiring a response text for the query text; and acquiring the event information by using the plurality of texts and the response text.

17. The control method of claim 10, wherein the first neural network model comprises:

at least one of a sentence sequence prediction model that inputs two texts among the plurality of texts and determines the sequence relation between the two texts or a sentence order prediction model that inputs the plurality of texts and determines the order among the plurality of texts.

18. The control method of claim 10, wherein the collecting comprises:

capturing the chat window of the message application; and performing optical character recognition (OCR) for the captured chat window image and extracting a plurality of texts displayed on the chat window.

19. The control method of claim 10, comprising:

acquiring a summary sentence corresponding to the event information from the plurality of texts; and providing a notification message including the acquired summary sentence.

20. A non-transitory computer readable medium for storing computer readable program code or instructions for carrying out operations, when executed by a processor, for acquiring event information, the operations comprising:

extracting a plurality of texts displayed on a chat window of a message application and collecting the plurality of texts;

inputting the collected plurality of texts into a trained first neural network model, and obtaining an ordered sequence of the plurality of texts, as an output of the trained first neural network model;

inputting the sequenced plurality of texts into a trained second neural network model and obtaining an identification result identifying whether additional information for acquiring event information from the collected plurality of texts is necessary, as an output of the trained second neural network model; and acquiring event information from the collected plurality of texts based on the identification result.

* * * * *